United States Patent [19]
Hannan et al.

[11] Patent Number: 5,406,843
[45] Date of Patent: Apr. 18, 1995

[54] DIGITAL LIQUID LEVEL SENSING APPARATUS

[75] Inventors: Alan R. Hannan; Thomas M. Nickolin, both of Cincinnati, Ohio

[73] Assignee: KDI Corporation, Inc., Cincinnati, Ohio

[21] Appl. No.: 143,834

[22] Filed: Oct. 27, 1993

[51] Int. Cl.⁶ ............................................. G01F 23/26
[52] U.S. Cl. ................................. 73/304 C; 73/292; 364/509
[58] Field of Search ............... 73/304 C, 292; 364/509

[56] References Cited

U.S. PATENT DOCUMENTS

| | | |
|---|---|---|
| 2,519,668 | 8/1950 | Konigsberg . |
| 2,544,012 | 3/1951 | Edelman . |
| 2,621,517 | 12/1952 | Sontheimer . |
| 2,638,000 | 5/1953 | Sontheimer . |
| 2,648,058 | 8/1953 | Breedlove . |
| 2,651,940 | 9/1953 | Kline . |
| 2,751,531 | 6/1956 | Barrett . |
| 2,866,337 | 12/1958 | Minneman et al. . |
| 2,868,015 | 1/1959 | Haropulos . |
| 3,343,415 | 9/1967 | Johnston . |
| 3,391,547 | 7/1968 | Kingston . |
| 3,534,606 | 10/1970 | Stamler et al. . |
| 3,552,209 | 1/1971 | Johnston . |
| 3,620,080 | 11/1971 | Ryder . |
| 3,935,739 | 2/1976 | Ells ............... 73/304 C |
| 4,086,528 | 4/1978 | Walton ............... 73/304 C |
| 4,099,167 | 7/1978 | Pomerantz et al. ............... 73/304 C |
| 4,173,893 | 11/1979 | Hedrick ............... 73/304 C |
| 4,235,106 | 11/1980 | Maltby et al. ............... 73/304 C |
| 4,258,422 | 3/1981 | Dougherty et al. ............... 364/509 |
| 4,266,144 | 5/1981 | Bristol ............... 73/304 C |
| 4,350,039 | 9/1982 | van Dyke et al. ............... 73/304 C |
| 4,350,040 | 9/1982 | Fasching et al. ............... 73/304 C |
| 4,373,389 | 2/1983 | Decker ............... 73/304 C |
| 4,417,473 | 11/1983 | Tward et al. ............... 73/304 C |
| 4,470,008 | 9/1984 | Kato ............... 73/304 C |
| 4,499,766 | 2/1985 | Fathauer et al. ............... 73/304 C |
| 4,545,020 | 10/1985 | Branfield ............... 364/509 |
| 4,553,434 | 11/1985 | Spaargaren ............... 73/304 C |
| 4,589,077 | 5/1986 | Pope ............... 364/509 |
| 4,611,489 | 9/1986 | Spaargaren et al. ............... 73/304 C |
| 4,676,101 | 6/1987 | Baughman ............... 73/304 C |
| 4,757,252 | 7/1988 | Maltby et al. ............... 73/304 C |
| 4,780,705 | 10/1988 | Beane ............... 73/304 C |
| 4,782,698 | 11/1988 | Wilson ............... 73/304 C |
| 4,841,227 | 6/1989 | Maier ............... 73/304 C |
| 5,138,880 | 8/1992 | Lee et al. ............... 73/304 C |
| 5,142,909 | 9/1992 | Baughman ............... 73/304 C |

FOREIGN PATENT DOCUMENTS

| | | | |
|---|---|---|---|
| 0103321 | 3/1984 | European Pat. Off. | ............ 73/304 C |
| 0538182 | 4/1993 | European Pat. Off. | ............ 73/304 C |
| 2662249 | 11/1991 | France | ............ 73/304 C |
| 58-123431 | 7/1983 | Japan . | |
| 748138 | 7/1980 | Russian Federation . | |
| 2066961 | 7/1981 | United Kingdom . | |
| 2074325 | 10/1981 | United Kingdom | ............ 73/304 C |
| 0381911 | 8/1973 | U.S.S.R. | ............ 73/304 C |

*Primary Examiner*—Diego F. F. Gutierrez
*Attorney, Agent, or Firm*—Harness, Dickey & Pierce

[57] ABSTRACT

A digital liquid level sensing apparatus for detecting variations in the dielectric of a substance being sensed. The apparatus includes a capacitive element array including a plurality of individual (i.e., segmented) input plates positioned along an axis of measurement of a fluid to be detected. The array also includes a common output plate having a length sufficient to span the entire accumulated length of the input plates. A controller sequentially applies DC excitation pulses to the input plates which cause a series of output currents to be coupled onto the output plate. The output currents are input to a current-to-voltage amplifier which generates a series of corresponding analog output voltages. The analog output voltages are then input to a peak voltage detector circuit to generate a series of peak voltage signals representative of the magnitudes of the analog output voltages. The controller converts each of the peak voltage signals into a corresponding digital value and stores each of the digital values in an on-board memory. The controller then sequentially compares each of the values against at least one predetermined reference value indicative of an output produced by an input plate disposed in air until a predetermined difference is detected between the reference value and any one of the stored digital values. This indicates a predetermined difference in the dielectric, thus indicating that a corresponding input plate is at least partially submerged in fluid.

11 Claims, 3 Drawing Sheets

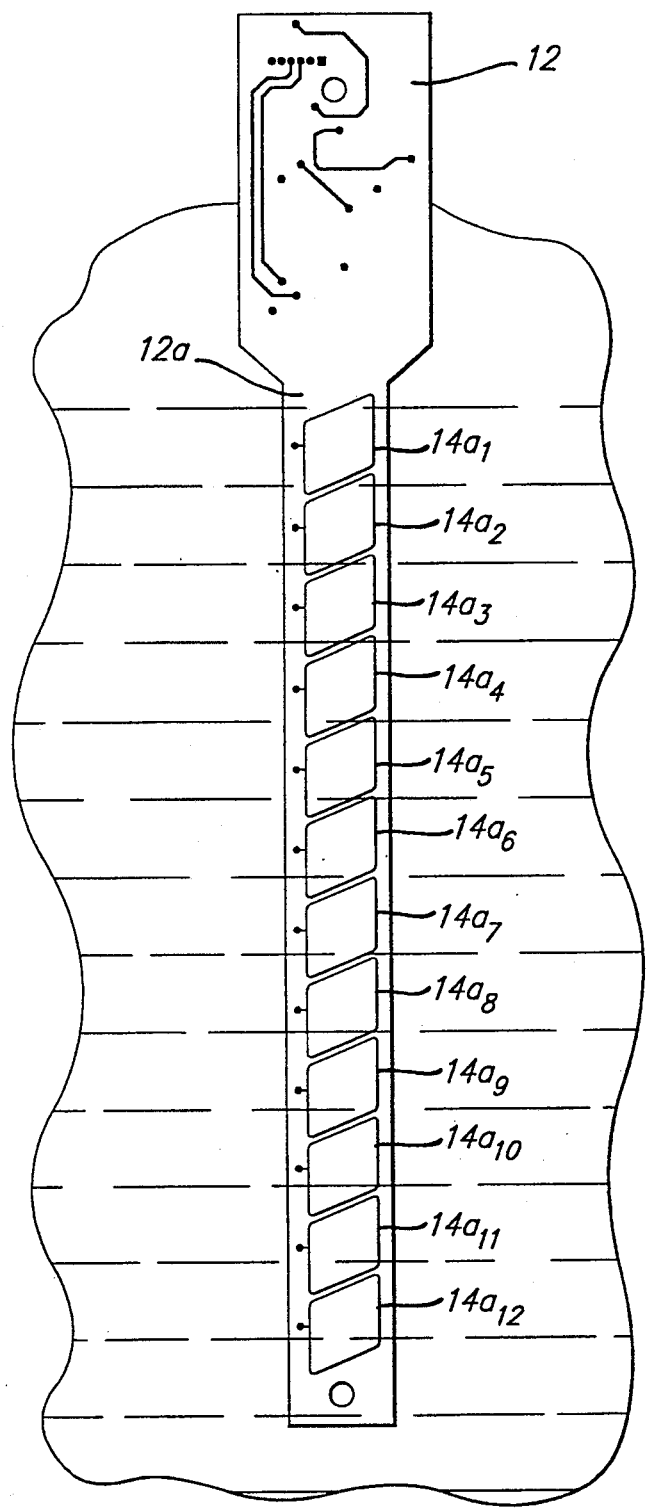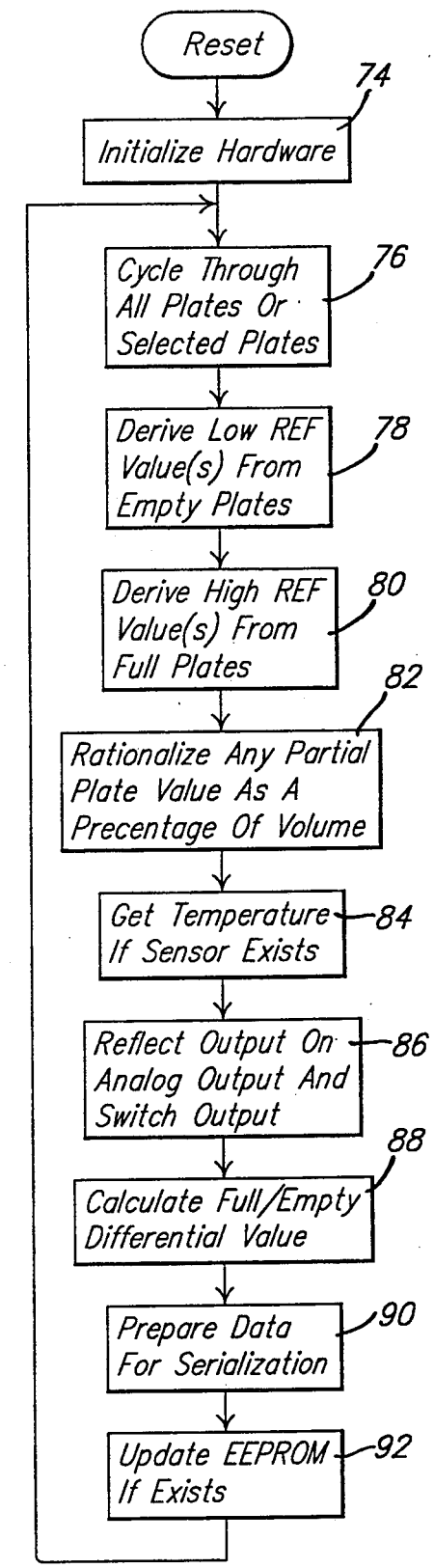
FIG. 2.
FIG. 4.

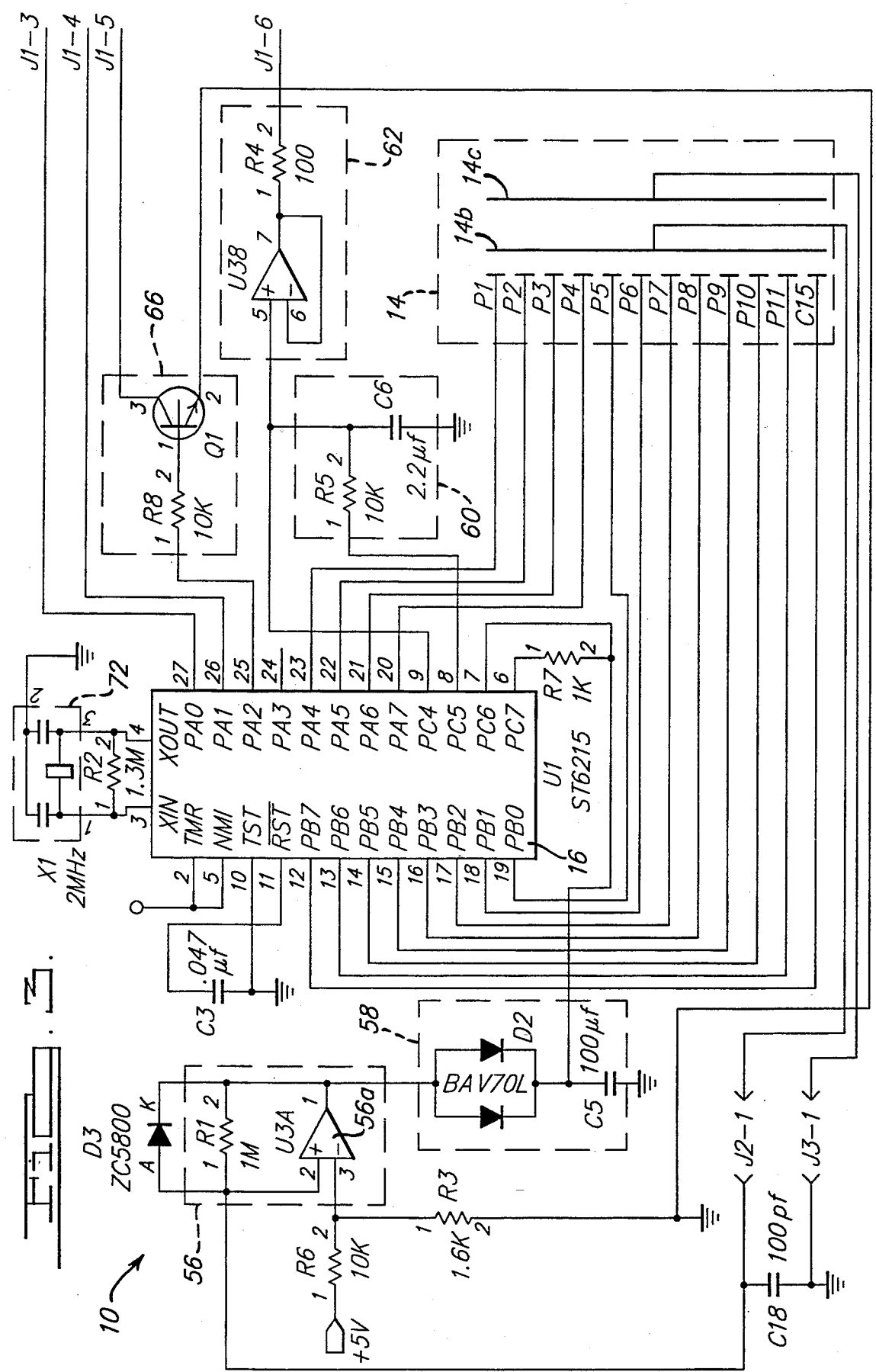

DIGITAL LIQUID LEVEL SENSING APPARATUS

BACKGROUND OF THE INVENTION

1. Technical Field

This invention relates to liquid level sensors, and more particularly to a digital liquid level sensing apparatus incorporating a dielectric constant differentiator for detecting variations in the dielectric of segmented portions of a capacitive probe.

2. Discussion

Liquid level sensors are used in a variety of applications to sense fluid levels in reservoirs where it is important or desirable to periodically or continuously monitor the level of the fluid within a reservoir. One form of liquid level sensor employs a capacitive probe having a pair of continuous, elongated elements (i.e., plates) positioned on a substrate of the probe. This form of sensing system makes use of the difference in the dielectric of air from various liquids. In such systems, some means is provided for generating a signal which is applied to one plate of the probe. The overall capacitance of the capacitor formed by the two plates, and thus the magnitude of the signal coupled onto the other one of the plates on the probe, will change as the percentage of the probe submerged in a fluid, and thus the two plates thereof, changes. Thus, the magnitude of the signal coupled onto the output plate of the probe can provide a relative indication of the area of the probe which is submerged in fluid and/or exposed in air.

Many prior developed systems incorporating capacitive probe technology have involved going to great lengths to fully characterize the dielectric constant of the substance whose level is being monitored in an effort to effect an accurate measurement of the level of the substance within a given reservoir. In some instances, such approaches have involved making some form of in-situ measurement of the dielectric constant. Other approaches attempt to avoid the affects of the varying dielectric constant by attempting to remove the variation from the measurement. This is highly desirable because the dielectric constant of a given substance may vary to a significant degree when the substance experiences severe temperature changes or contamination from other substances which enter the reservoir. Thus, the overall accuracy of many such liquid level sensing systems incorporating capacitive probe technology can be greatly adversely affected by changes in the dielectric constant of the substance being measured as the composition of the subject is subjected to various environmental factors (e.g., temperature) and as the composition of the substance varies over a period of time.

One application where liquid level sensors are particularly desirable is with automotive vehicles. Recently there has been increasing interest in monitoring an even greater number of different fluids associated with motor vehicles to ensure that such fluids remain at optimum levels. For example, there has been increasing interest in incorporating sensing apparatus for sensing engine coolant levels, transmission fluid levels and differential case fluid, just to name a few. The use of liquid level sensing apparatus with such fluids, however, presents a number of problems due to the extreme environmental changes which such a sensing apparatus must be able to tolerate, as well as the cost constraints which must be met in order for the apparatus to be economically mass produced without adding significantly to the overall price of the vehicle.

Recently released requirements, typical of the auto industry at large, for a fuel level sensor are listed below to provide an idea of the stringency of present day operational parameters which a fuel level sensor suitable for use in automotive applications must meet:

A. Temperature Range - (−)40° C. to 150° C.
B. Life - 20 Years
C. Response Time - preferably in the area of about or reasonably close to 15 milliseconds
D. Accuracy - 0.5 gallons minimum
 - 0.1 gallons preferred
E. EMI/RFI - Must be operational in close proximity to fuel pump
F. Fuel Tolerance - Sensor must be capable of meeting accuracy requirements for the following fuel types:
 TF1
 TF2
 UNLEADED GASOLINES
 100% INDOLENE HO-III
 PEROXIDE FUEL MIX
 METHANOL FUEL MIX
 CORROSIVE GASOHOL
 Additionally, the sensor must be capable of limited exposure to 2 RVP Fuel as well as not being adversely affected by exposure to legal and commercial fuels in the Asian, Mideast and European markets.
G. Underbody Contaminants - The sensor must withstand prolonged exposure to the following list of potential underbody contaminants:

| | |
|---|---|
| Engine Oil | Transmission Fluid |
| Power Steering Fluid | Coolant/Antifreeze |
| Brake Fluid | Windshield Wash Fluid |
| Transaxle/Differential Lube | Wheel Bearing Lube |
| Water | A/C Refrigerant |
| Snow, Ice | Acid Rain |
| Car Wash Chemicals | Waxes, Paint Sealants |
| Steam Cleaning | Tire Cleaners |
| Engine Cleaning | Carpet Cleaners |
| Soft Drinks, Coffee, Etc. | |

H. Space/Size Requirements - The sensor shall be contained preferably reasonably close to the following form factors:
 15 × 4 × 175 MM   15 × 4 × 400 MM
 10 × × 175 MM   10 × 6 × 400 MM
I. Electrical Requirements -
 Operational Voltage: 10.5 to 16.5 volts
 Output voltage: 0 to 4.8 volts linearly related to measured level.
J. Mechanical Requirements - Sensor must survive a three feet vertical drop and still meet the electrical requirements.

As mentioned above, to be suitable for use in automotive applications any liquid level sensor must meet the above requirements in addition to being capable of manufacture at a relatively low cost. This places an additional constraint on the design of the liquid level sensing system. In summary then the fluid level sensing system must accurately measure a variety of materials (i.e., fluids) in a hostile environment as well as being capable of economical manufacture.

Accordingly, it is a principal object of the present invention to provide a liquid level sensing apparatus incorporating a capacitive probe which senses the level of a liquid within a reservoir within which the capacitive probe is placed and which provides a sufficiently high level of accuracy which is not affected by changes in the dielectric constant of the substance being monitored.

It is another object of the present invention to provide a liquid level sensing apparatus which detects the level of a liquid within a fluid reservoir by detecting significant changes in the capacitance of a capacitive sensing probe having a plurality of segmented capacitors formed longitudinally thereon along an axis of measurement of the probe.

It is still another object of the present invention to provide a liquid level sensing apparatus capable of differentiating the dielectric constant of a substance at a plurality of points along a segmented capacitive probe disposed in the substance to thereby provide the capability of determining not only the point at which the capacitive probe becomes disposed in air, but also changes in the dielectric constant of the substance.

It is still another object of the present invention to provide a liquid level sensing apparatus which is economical to manufacture and suitable for use in hostile environments such as those encountered in various fluid reservoirs on a motor vehicle, and which meets or exceeds industry operating requirements.

SUMMARY OF THE INVENTION

The above and other objects are provided by a digital liquid level sensing apparatus in accordance with preferred embodiments of the present invention. The apparatus includes a segmented capacitive probe having a plurality of independent input plates positioned longitudinally thereon along an axis of measurement of the probe and a common output plate having a length sufficient to span the total length of the input plates. The input plates are coupled to a plurality of independent outputs of a controller. The controller generates a plurality of sequential output signals to electrically excite each of the input plates one plate at a time. As each input plate is electrically excited it causes an output current to be coupled onto the common output plate. The magnitude of the output current depends on the capacitance, which in turn depends on the dielectric constant of the substance between the excited input plate and the common output plate.

The common output plate is coupled to means for converting the current output to a corresponding voltage. In the preferred embodiments this current converting means is comprised of a current to voltage amplifier. The current to voltage amplifier generates a voltage signal having a magnitude which "tracks" the output current coupled onto the common output plate and generates a series of voltage signals representative of the output currents generated as each input plate is electrically excited by the controller. A peak voltage detector receives each of the voltage signals and generates a peak voltage signal therefrom representative of the peak level of the output current coupled onto the common output plate from each one of the input plates.

Each of the peak voltage signals is applied to an input of the controller which compares the peak voltage signals generated on the common output plate from any given input plate with a predetermined reference value stored in a first memory of the controller. Accordingly, the controller performs a plurality of comparisons, sequentially, of the output signals caused from the excitation of each input plate.

In the preferred embodiments each of the peak voltage output signals are converted into a digital representation by an analog-to-digital (A/D) converter of the controller and stored in a second memory of the controller. In the preferred embodiments the predetermined reference value may be calculated from a reference input plate, such as an input plate which is disposed in air even when the reservoir is full of fluid. Alternatively, this value may be a predetermined value which is stored in a read only memory of the controller, or alternatively in external memory such as an electrically erasable, programmable read only memory along with other historical information relating to each particular input plate. One or more additional reference values relating to completely submerged input plates may also be stored in the above-mentioned memories.

An appropriate program controls the comparisons between the output signals generated at the output plate from each of the input plates such that the output signal corresponding to each one of the input plates is subsequently compared against the reference value. The percentage coverage of any partially submerged plate(s) is also rationalized by the controller from the one or more stored reference values. In this matter the controller can detect even extremely small differences in the output signals resulting from excitation of any particular one of the input plates. Accordingly, even input plates which are only partially submerged in fluid cause an output signal which reflects this condition, and which can be readily detected by the controller. Thus, the fluid-air interface can be readily and accurately determined. Variations in the dielectric of the fluid being sensed further do not adversely affect the detection of the fluid-air interface.

In alternative preferred embodiments the apparatus includes an integrator circuit for receiving an output signal from the controller representative of the total coverage of the capacitive plates of the probe in fluid, and for providing an analog output signal indicative of the overall fluid level within the reservoir. In another alternative preferred embodiment the apparatus includes a bi-directional serial interface for enabling bi-directional communication between the controller and any external serial device. The controller of the apparatus may also optionally include means for generating a low level output signal when the sensed fluid level falls below a predetermined minimum level.

While the preferred embodiments of the present invention are particularly well adapted for use with automotive vehicle applications, it will be appreciated that the invention could be used in connection with the sensing of virtually any liquid substance as well as a variety of solid substances such as granular or plate type substances. Applications of the apparatus are further not limited to level sensing but could just as easily include humidity sensing, position indicating systems and dielectric strength testing systems. The preferred embodiments of the apparatus provide a relatively low cost, low power consumption apparatus for effectively differentiating dielectric strengths and for accomplishing accurate liquid level sensing.

In yet another alternative preferred embodiment, the apparatus of the present invention incorporates a temperature probe which senses temperature changes in the fluid in which the capacitive plates of the probe are disposed. Changes in the dielectric constant of the fluid due to temperature changes can thereby be factored into the determination of the percentage of coverage of any particular input plate. This further increases the accuracy of the liquid level determination.

BRIEF DESCRIPTION OF THE DRAWINGS

The various advantages of the present invention will become apparent to one skilled in the art by reading the following specification and subjoined claims and by referencing the following drawings in which:

FIG. 2 is an illustration of the capacitive probe showing an exemplary form which the substrate may take and the overlapping of the input plates;

FIG. 3 is a more detailed electrical schematic diagram of the apparatus of FIG. 1; and FIG. 4 is flow chart of the series of steps performed by the controller of the apparatus in detecting the presence and absence of fluid along the capacitive probe of the apparatus.

DETAILED DESCRIPTION OF THE PREFERRED EMBODIMENTS

Figure 1:
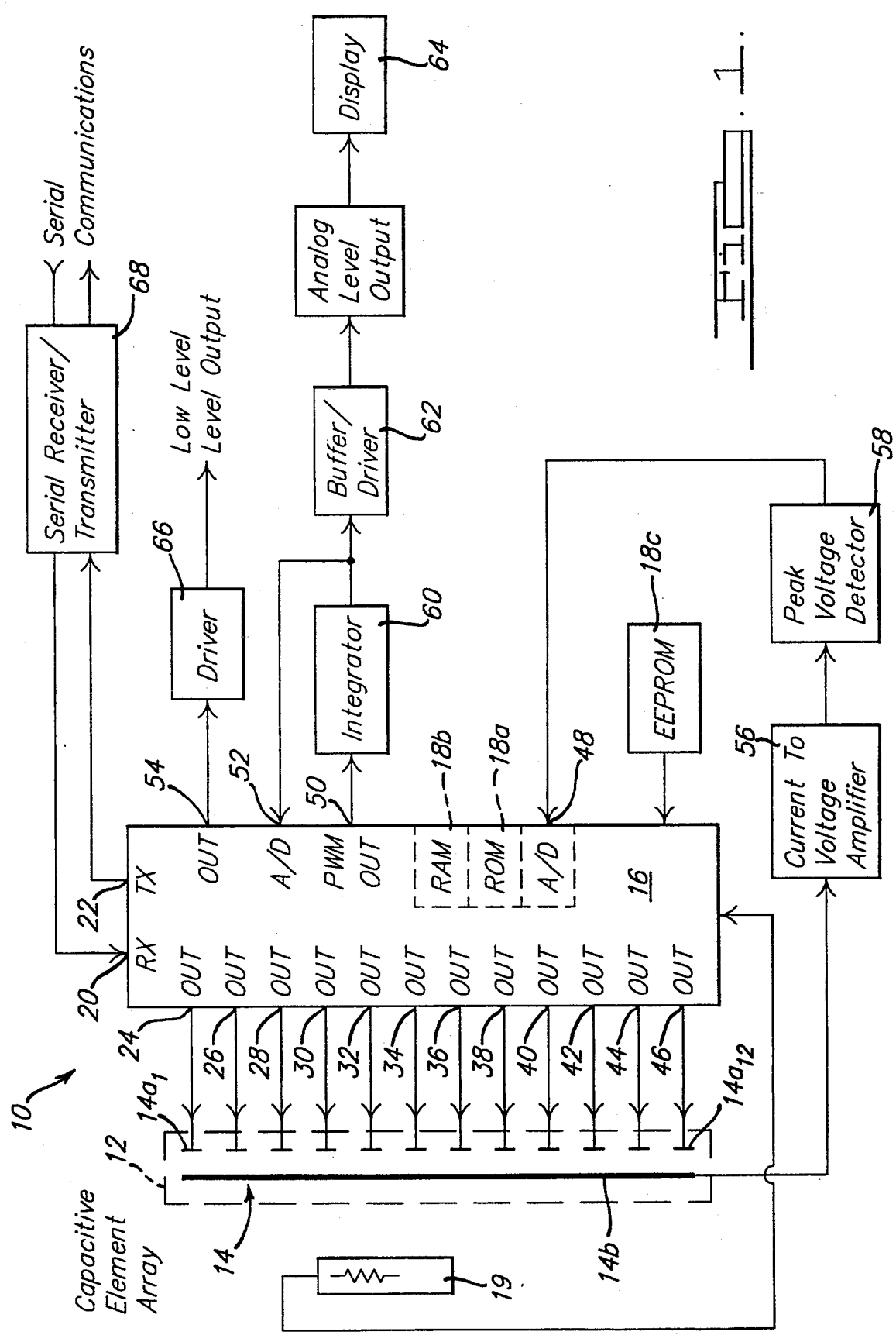
FIG. 1 is a block diagram of a digital liquid level sensing apparatus in accordance with a preferred embodiment of the present invention, and, also showing several optional, yet desirable, circuit components for implementing various optional functions.

Referring to FIG. 1, there is shown a block diagram of a digital liquid level sensing apparatus 10 in accordance with a preferred embodiment of the present invention. The apparatus 10 generally includes a capacitive element array 14 which is disposed on a substrate 12. The array 14 includes a plurality of input plates $14a_1$–$14a_{12}$ and a common output plate 14b. The output plate 14b has a length which is sufficient to span the entire length of the adjacently positioned input plates $14a_1$–$14a_{12}$ and both the common output plate 14b and plurality of input plates $14a_1$–$14a_{12}$ are disposed longitudinally along an axis of measurement of a fluid to be measured within a fluid reservoir.

Each of the input plates $14a_1$–$14a_{12}$ of the capacitive element array 14 are coupled to independent outputs of a controller 16. In the preferred embodiments the controller comprises a microcontroller having a read-only memory (ROM) 18a and a random access memory (RAM) 18b the function of each of which will be described momentarily. It will be appreciated, however, that one or more external memory devices may be used in lieu of the memory devices 18a and 18b if for some reason this is desirable to meet the needs of a particular application. In another preferred embodiment an electrically erasable, programmable, read-only memory (EEPROM) 18c is used for storing reference values for each input plate $14a_1$–$14a_{12}$. In connection with this embodiment an optional temperature sensor 19 may also be incorporated to provide indications of changes in temperature of the fluid in which the array 14 is disposed, which in turn can indicate changes in the dielectric constant of the fluid. By taking into account the changes in the dielectric constant due to temperature, an even more accurate determination can be made as to the percentage coverage of each input plate $14a_1$–$14a_{12}$.

In the preferred embodiments the controller 16 comprises a SGS microcontroller which includes serial communications ports RX 20 and TX 22, and a plurality of output ports 24–46 which are electrically coupled to the input plates $14a_1$–$14a_{12}$. The controller 16 further includes a first analog-to-digital input 48 in communication with an internal analog-to-digital (A/D) converter, a pulse width modulated (PWM) output 50, a second analog-to-digital input 52 and an output port 54.

The common output plate 14b of the capacitive element array 12 is coupled to an input of a current to voltage amplifier 56. The amplifier 56 has its output coupled to an input of a peak voltage detector circuit 58. The output of the peak voltage detector circuit 58 is in turn coupled to the A/D input 48 of the controller 16.

The PWM output 50 of the controller 16 is coupled to an integrator circuit 60. The output of the integrator 60 is in turn coupled to a buffer/driver circuit 62 which generates an analog output level signal to an external analog display device 64. The output of the integrator 60 is shown being coupled back to the A/D input 52 of the controller 16 such that a digital signal can be developed representative of the analog level output signal from the integrator 60. While circuit 60 has been referred to for convenience as an "integrator" circuit, it will be appreciated that this circuit in fact forms a low pass filter with a cut-off frequency far below the repetition rate of the PWM output 50. This causes the circuit to function as an "averaging" circuit with an output voltage equal to the pulse amplitude times the ratio of the pulse width/repetition rate.

The output 54 of the controller 16 is coupled to an optional driver circuit 66 for generating a low fluid level warning output signal. Thus, if the controller 16 determines that the detected fluid level is below a predetermined lower limit, the controller 16 generates a signal on output port 54 which driver circuit 66 uses to generate a warning to an operator of a vehicle or other system with which the apparatus 10 is being used that a particular fluid level is below an acceptable lower limit. While this function of the controller 16 is optional, it is expected at the present time that it will be desirable in many applications, and particularly in those involving automotive vehicles, where it is desirable to provide a warning to an operator of the vehicle immediately if a particular fluid level drops below a predetermined lower limit.

The signal from output port 54 is particularly useful in connection with sensing the level of oil in an oil reservoir of a vehicle. In automotive applications, it is important that the oil level within the oil pan of the vehicle not be allowed to fall below a minimum predetermined level. If such an event occurs, it is very important that the operator of the vehicle be notified immediately by some visual or audible means.

The controller 16 is bi-directionally coupled to a serial receiver/transmitter circuit 68 via the RX and TX outputs 20 and 22, respectively. The serial receiver/transmitter circuit 68 essentially comprises a serial interface circuit which allows the controller 16 to communicate with another external controller, such as an engine control module of an automotive vehicle, to thereby enable a signal representative of the sensed fluid level to be communicated to the external device and other information to be communicated to the controller 16.

Referring to FIG. 2, the apparatus 10 is disposed on the substrate 12 such that the capacitive element array 14 is disposed on an elongated portion 12a of the substrate 12 within the fluid when positioned in a reservoir. It is anticipated that in most instances all the input plates $14a_1$–$14a_{12}$ will be disposed in fluid when the reservoir is completely full. In the preferred embodiments the input plates $14a_1$–$14a_{12}$ are each formed in the shape of a parallelogram and positioned such that portions of adjacent ones of the plates overlap slightly. This provides plate surfaces along the entire length of the input plates, thus eliminating the "gaps" that would otherwise exist between adjacent input plates $14a_1$–$14a_{12}$.

Referring again to FIG. 1, a description of the operation of the apparatus 10 will now be provided. Initially, the ROM 18a of the controller 16 will include a predetermined "air plate" reference value corresponding to the output current coupled onto the common output plate 14b when any input plate is disposed in air. A predetermined "full plate" reference value will also be stored in the ROM 18a corresponding to an approximate expected output from the output plate 14b produced from exciting an input plate which is completely submerged in fluid.

The controller 16 sequentially applies a very short duration DC voltage pulse to each one of the input plates $14a_1$–$14a_{12}$, one at a time. For example, when the input DC pulse is applied to input plate $14a_2$, an output current is coupled onto the common output plate 14b. The output current will vary in magnitude depending on the capacitance of the capacitor formed between input element $14a_2$ and common output plate 14b. Since the dielectric of air differs significantly from that of liquids, if the input plate $14a_2$ happens to be disposed in air the output current coupled onto the common output plate 14b will be of a lower magnitude than the current that would be coupled thereon if the input plate $14a_2$ had been submerged in liquid. Thus, the output current coupled onto the common output plate 14b as a result of the input signal applied to each one of the input plates $14a_1$–$14a_{12}$ provides an indication as to whether a particular input plate $14a_1$–$14a_{12}$ is disposed in air, submerged in fluid, or at least partially disposed in fluid.

The controller 16 applies the DC input excitation pulses to the input elements $14a_1$–$14a_{12}$ sequentially such that a series of independent output currents are coupled onto the common output plate 12 and input to the current voltage amplifier 56. In some instances each of the input plates $14a_1$–$14a_{12}$ may not need to be pulsed one at a time. For example, a fast response time algorithm may be used to pulse three of the input plates virtually simultaneously once a partially submerged plate is discovered to thereby allow a plurality of outputs from a corresponding plurality of input plates to be "tracked."

Amplifier 56 generates a series of independent analog voltage signals which each represent the output current coupled onto the output plate 14b by a particular one of the input plates $14a_1$–$14a_{12}$. It is important to note that the common output plate 14b is not allowed to change its voltage potential while input pulses are independently applied to each of the input plates $14a_1$–$14a_{12}$. A changing voltage on the common output plate 14b could potentially cause measurement errors due to current coupling onto other capacitors and other stray parasitic capacitances.

The peak voltage detector circuit 58 generates a series of peak voltage signals which represent the output signals coupled onto the common output 14b as a result of excitation of each one of the input plates $14a_1$–$14a_{12}$. The controller 16 converts these peak voltage signals into a series of corresponding digital values and stores same in the RAM 18b. The controller 16 then, through the control of appropriate software, develops a table of differences from the output currents caused by excitation of all of the input elements $14a_1$–$14a_{12}$. Put differently, a table of digital values is produced corresponding to the outputs generated by exciting the input plates $14a_1$–$14a_{12}$. The controller 16, through its software, then proceeds to compare the differences of the digital output values produced by the input plates $14a_1$–$14a_{12}$ with the previously stored "air plate" and "full plate" reference values. The software program looks for a predetermined, significant difference in the magnitude of the output signal caused by each input plate when compared to the air plate reference value. When the controller detects a predetermined significant difference between a digital value and the air plate reference value, this is an indication that the present digital value corresponds to an output signal generated by a specific, known input plate which is at least partially covered with fluid. As the controller 16 continues to make successive comparisons and determines additional differences between each subsequent digital value and the air plate reference value stored in the ROM 18a, it readily determines which of the input plates are completely disposed in fluid based on the degree of variation of each digital value from the air plate reference value. The percentage of coverage (i.e., submergence) of any particular input plate can then be approximated based on its comparison to the air plate reference value and the full plate reference value. Since the relative position of the apparatus 10 within the reservoir is predetermined, in addition to the shape of the reservoir and the overall volume of the reservoir, detecting the precise point along the axis of measurement at which the liquid-air interface is present allows the overall level of the liquid within the reservoir to be readily extrapolated.

It is anticipated future versions of the apparatus 10 will incorporate software enhancements to compensate for irregular geometries of the containment vessel or reservoir. A look-up table which assigns scaling values to segments according to their position along the array 14 will provide the required correction factors to compensate for odd-shaped reservoirs.

In an alternative preferred form of operation, the predetermined air plate and full plate reference values are used together with real time calculating of "average" air and full plate reference values. In this form of operation the software repeatedly calculates an average air plate value by taking the outputs produced from input plates $14a_1$–$14a_{12}$ which are determined (by comparison with the air plate reference value) to be disposed entirely in air and obtaining an average air plate reference value from these input plates $14a_1$–$14a_{12}$. Similarly, an average full plate reference value is obtained from those input plates $14a_1$–$14a_{12}$ which are determined (initially by comparison to the predetermined air plate or predetermined fullplate reference value) to be completely submerged in fluid. This is done by obtaining the average output produced by the input plates $14a_1$–$14a_{12}$ which are completely submerged in fluid. These average air plate and full plate reference values are then used to rationalize, more accurately, the percentage coverage of any partially submerged input plate $14a_1$–$14a_{12}$. This averaging may be expressed by the following formula:

$$\text{Percentage Coverage} = \frac{\text{V measured} - \text{V ref}_{low})}{\text{V ref}_{high} - \text{V ref}_{low}}$$

where V measured = measured voltage output value
where V ref$_{low}$ = reference output voltage for a free air input plate; and
where V ref$_{high}$ = reference output voltage for a fully submerged input plate These average reference values are repeatedly calculated, in real time, to take into account small changes in the dielectric constant of the fluid. The percentage coverage value may then be multiplied by a suitable scaling or weighting factor relating to that particular input plate's relative position in the reservoir and/or the volume of fluid in the reservoir.

In yet another preferred form of operation the EEPROM 18c is used to store actual full plate and air plate reference values for each single input plate $14a_1$–$14a_{12}$. These actual reference values are repeatedly updated during operation such that when a particular input plate $14a_1$–$14a_{12}$ is determined to be at least partially submerged, its percentage of submergence can be even more accurately determined. If the temperature sensor 19 is used with this embodiment, then the controller 16 can further modify the actual air plate and full plate reference values in accordance with changes in the temperature of the fluid, which temperature changes can affect the dielectric constant of the fluid. To this end a suitable look-up table stored in some memory of the apparatus 10 could be accessed by the controller 16 to obtain appropriate correction factors to be applied based on specific changes in the sensed temperature.

Referring to FIG. 3, a more detailed schematic diagram of the apparatus 10 is shown. In the drawing of FIG. 3 a second capacitive output plate 14c is included on the substrate 14. This output plate 14c is maintained at ground and, in effect, a shield to protect the common output plate 14b from noise currents by shunting any such currents to ground, for systems using a common ground. Preferably, the printed circuit board upon which the apparatus 10 is disposed has an internal ground plane to further eliminate noise transfer.

With further reference to FIG. 3, the current to voltage amplifier 56 comprises an operational amplifier 56a incorporating a feedback resistor R1 coupled to its inverting input to thereby provide a negative feedback loop. Its value is determined based on initial open plate (i.e., an input plate in air) capacitance. Resistors R6 and R3 form a voltage divider for generating a suitable input voltage to the non-inverting input of the operational amplifier 56a. It should be noted that a desirable characteristic of the amplifier 56 is that its output voltage is only affected by input elements which source or sink current from the inverting node (input) of the operational amplifier 56a, which is at virtual ground potential. Since the output plate 14b is tied to this input, many problems otherwise encountered with a common element approach are eliminated. In operation, the adverse loading effects caused by the parasitic capacitance of the un-driven input plates $14a_1$–$14a_{12}$ is ignored because of this principle.

The peak voltage detector circuit 58 is formed by diode D2 coupled in parallel with capacitor C5. The peak detector 58 functions to capture the peak amplitude of the output pulse generated on the output plate 14b, for each input pulse generated by the controller 16, long enough for the controller 16 to read the signal with its internal A/D converter. Diode D3 prevents gain from positive currents into the amplifier 56 which would try to otherwise make the output of the amplifier 56 go negative. The integrator 60 of FIG. 1 is shown in FIG. 3 as being represented by resistor R5 and capacitor C6. Buffer/driver circuit 62 is represented by operational amplifier U3B and resistor R4. The driver circuit 66 is represented by resistor R6 and NPN transistor Q1. The receive (RX) port 20 and the transmit (TX) port 22 of the controller 16 are shown as ports 27 and 26, respectively, of the controller 16. A ceramic resonator 72 is coupled to the clock inputs of a controller 16 to provide a timing signal of preferably about 2–8 Mhz to the controller 16.

Referring now to FIG. 4, a flowchart is provided which further illustrates the steps of operation of the preferred form of operation of the apparatus 10. At step 74 the controller 16 is initialized. At step 76 the controller cycles through all, or at least a selected sub-plurality, of the input plates $14a_1 14a_{12}$ to obtain a digital output value associated with each input plate $14a_1$–$14a_{12}$. At step 78 the controller 16 mathematically derives the average air plate (i.e., low plate) reference value from all the input plates which are disposed completely in air. As indicated at step 80, the controller then mathematically derives the average full plate reference value from all the input plates $14a_1$–$14a_{12}$ which are completely submerged in fluid.

At step 82, the controller determines any input plate $14a_1 14a_{12}$ which is not entirely disposed in air or which is not completely submerged in fluid and further determines the percentage coverage of the input plate (i.e., the percentage of the plate which is submerged in fluid). The controller then reads the temperature sensor 19, if this component is being used, as indicated at step 84 and then prepares to output a signal to at least the PWM controller output 50, as indicated at step 86.

Optionally, the controller 16 may calculate the full-/empty differential value between a given input plate's outputs when the input plate is completely submerged in fluid and completely disposed in air, as indicated at step 88. This provides an indication of the dielectric strength of the fluid itself.

Next, the software prepares the data obtained for serial output from port 22, as indicated at step 90. The EEPROM 18c is then updated if this component is being used, as indicated at step 92.

By differentiating the dielectric strength at segmented capacitive input elements, the apparatus 10 of the present invention lends itself well to a variety of applications wherever the dielectric strength of capacitive elements of a probe varies with the level of the substance being detected. Applications of the methodology of the present invention include fluid, gaseous and solid dielectric strength measurements. Specific applications for which the apparatus 10 is particularly well adapted include liquid and solid (granular or plate type substances) level sensing, humidity sensing, and use as a dielectric strength tester and position indicator.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed:

1. An apparatus for detecting a fluid level within a fluid reservoir within which a capacitive element array is disposed, wherein the capacitive element array includes a plurality of independent input plates spaced longitudinally along an axis of measurement and a single output plate disposed generally parallel to said input plates and having a length sufficient to span all of said input plates, said apparatus comprising:

controller means for sequentially applying an input signal to each one of said input plates sequentially, one at a time, to thereby electrically excite each said input plate;

current to voltage amplifier means responsive to said output plate for generating a voltage signal representative of the current coupled onto said output plate each time one of said input plates is electrically excited by said controller means;

peak detector means responsive to said current to voltage amplifier means for generating a peak voltage signal representative of the peak magnitude of the voltage output signal from said current to voltage amplifier means each time one of said input plates is electrically excited by said controller means;

means for storing each one of said peak voltage signals associated with the current coupled onto to said output plate for each input plate excited by said controller means;

said controller means including means for comparing said peak voltage output signals generated from the excitation of said input plates, one of said input plates at a time in sequential fashion against a reference value, and for determining the difference in each of said peak voltage output signals from said reference value, to thereby detect a change in the dielectric from any one of said input plates relative to said reference value, to thereby detect a liquid-/air interface within said fluid reservoir from which a level of said liquid can be determined.

2. The apparatus of claim 1, further comprising integrator means for integrating an output signal generated by said controller means representative of said peak voltage output signals for providing an analog indication of a level of said liquid within said reservoir.

3. The apparatus of claim 1, further including interface means in communication with said controller means for coupling an output representative of said liquid level to an external device.

4. The apparatus of claim 1, wherein said controller means includes means for generating an output signal when said liquid level within said reservoir is determined to be below a predetermined lower level limit.

5. The apparatus of claim 1, further comprising an electrically erasable, programmable, read-only memory for storing information for each one of said input plates relating to outputs generated when each said input plate is completely disposed in air and completely submerged in fluid.

6. The apparatus of claim 1, further comprising means for sensing a temperature of said fluid and providing a signal representative of said sensed temperature to said controller.

7. A liquid level sensing apparatus for detecting a fluid-air interface level and a fluid reservoir containing a fluid therein;

a capacitive probe positioned within said reservoir longitudinally along an axis of measurement of said fluid, said probe comprising a plurality of independent input plates positioned in a common plane longitudinally along said probe and along said axis of measurement and a common output plate having a length sufficient to span a total accumulated length of said input plates;

a controller for generating a plurality of input pulses to each of said input plates sequentially, only one said input plate at a time, to thereby couple a sequential series of independent current signals onto said common output plate;

a current to voltage amplifier coupled to said common output plate for generating a plurality of independent voltage signals corresponding to the magnitude of each one of said current signals coupled onto said common output plate;

a peak voltage detector circuit responsive to said current to voltage amplifier for generating a series of peak voltage signals, each one of said series of peak voltage signals corresponding to a particular one of said current signals coupled onto said common output plate from a particular one of said input plates;

said controller including means for comparing the peak voltage signals from each of said input plates with a predetermined reference value, sequentially, to detect for a predetermined difference in magnitude between each of said peak voltage signals and said reference value;

said predetermined difference in magnitude being indicative of a change in a dielectric at a specific one of said input plates from which change a liquid-air interface can be determined.

8. The apparatus of claim 7, wherein said controller includes means for generating pulse width modulated output signals from said peak voltage output signals which is representative of the percentage of said common output plate and said input plates which are submerged in said fluid; and wherein said apparatus further includes an integrator responsive to said pulse width modulated output signals for generating an analog output level signal representative of said percentage of coverage of said common output plate and said input plates by said fluid.

9. The apparatus of claim 7, further comprising a serial receiver/transmitter interface circuit in communication with said controller; and wherein said controller includes means for generating a serial output signal indicative of a percentage of area of said common output plate and said input plates which is submerged in said fluid at a given time, and for transmitting said serial output to an external apparatus.

10. The apparatus of claim 7, wherein said controller includes means for generating a low level output signal when said controller determines that said liquid-air interface is below a predetermined minimum fluid level within said reservoir.

11. The apparatus of claim 7, wherein said input plates are positioned along said axis of measurement such that a portion of each one of said input plates overlaps a portion of its immediately adjacent input plates.

* * * * *

UNITED STATES PATENT AND TRADEMARK OFFICE
CERTIFICATE OF CORRECTION

PATENT NO. : 5,406,843
DATED : Apr. 18, 1995
INVENTOR(S) : Alan R. Hannan et al

It is certified that error appears in the above-indentified patent and that said Letters Patent is hereby corrected as shown below:

Col. 2, line 40, "10 X X 175 MM" should be -- 10 X 6 X 175 MM --;

Col. 10, line 4, "$14a_1 14a_{12}$" should be -- $14a_1$ - $14a_{12}$ --; and

Col. 10, line 14, "$14a_1 14a_{12}$" should be -- $14a_1$ - $14a_{12}$ -- .

Signed and Sealed this

Twelfth Day of March, 1996

Attest:

BRUCE LEHMAN

Attesting Officer　　　Commissioner of Patents and Trademarks